US012792153B2

(12) United States Patent
Wang et al.

(10) Patent No.: US 12,792,153 B2
(45) Date of Patent: Nov. 10, 2026

(54) TACTILE FEEDBACK METHOD, APPARATUS FOR VIRTUAL KEY AND ELECTRONIC DEVICE

(71) Applicant: AAC Acoustic Technologies (Shanghai) Co., Ltd., Shanghai (CN)

(72) Inventors: Xiuyue Wang, Shanghai (CN); Liyi Zhou, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 227 days.

(21) Appl. No.: 18/741,738

(22) Filed: Jun. 12, 2024

(65) Prior Publication Data

US 2025/0172998 A1 May 29, 2025

Related U.S. Application Data

(63) Continuation of application No. PCT/CN2023/135058, filed on Nov. 29, 2023.

(51) Int. Cl.

*G06F 3/01* (2006.01)
*G06F 3/04886* (2022.01)

(52) U.S. Cl.

CPC .......... *G06F 3/016* (2013.01); *G06F 3/04886* (2013.01); *G06F 2203/014* (2013.01)

(58) Field of Classification Search

CPC . G06F 3/016; G06F 3/04886; G06F 2203/014
See application file for complete search history.

(56) References Cited

U.S. PATENT DOCUMENTS

2010/0020036 A1* 1/2010 Hui .................... G06F 3/04886 715/702
2010/0231541 A1* 9/2010 Cruz-Hernandez ..... G06T 15/04 715/702
2012/0113008 A1* 5/2012 Makinen ............ G06F 3/04883 345/168

(Continued)

OTHER PUBLICATIONS

Jansen et al. 2010. MudPad: tactile feedback and haptic texture overlay for touch surfaces. In ACM International Conference on Interactive Tabletops and Surfaces (ITS '10). Association for Computing Machinery, New York, NY, USA, 11-14. https://doi.org/10.1145/1936652.1936655 (Year: 2010).*

*Primary Examiner* — Daniel Samwel
(74) *Attorney, Agent, or Firm* — Wiersch Law Group

(57) ABSTRACT

A tactile feedback method and apparatus for a virtual key, a device and a storage medium are provided. The method includes: detecting key operation status data in response to a key operation event; determining a key operation type according to the key operation status data, where the key operation type includes: key tapping operation, key surface touch operation, and key edge touch operation; selecting a tactile feedback strategy according to the key operation type and the key operation status data, where the tactile feedback strategy includes a tactile feedback mode and a corresponding tactile feedback attribute; and controlling an actuator to operate in a vibration working state according to the tactile feedback strategy. In this way, the tactile feedback strategy is selected according to the key operation type and key operation status data, so that users can locate and identify the virtual key and can blindly type, improving user experiences.

5 Claims, 7 Drawing Sheets

(56) References Cited

U.S. PATENT DOCUMENTS

| | | | | |
|---|---|---|---|---|
| 2014/0098024 | A1* | 4/2014 | Paek | G06F 3/023<br>345/168 |
| 2019/0064997 | A1* | 2/2019 | Wang | G06F 3/04886 |

* cited by examiner

TACTILE FEEDBACK METHOD, APPARATUS FOR VIRTUAL KEY AND ELECTRONIC DEVICE

CROSS REFERENCE TO RELATED APPLICATIONS

The present application is a continuation of PCT Patent Application No. PCT/CN2023/135058, entitled "TACTILE FEEDBACK METHOD AND APPARATUS FOR VIRTUAL KEY, DEVICE AND STORAGE MEDIUM," filed Nov. 29, 2023, which is incorporated by reference herein in its entirety.

TECHNICAL FIELD

Embodiments of the present disclosure relate to the technical field of tactile feedback, and in particular, to a tactile feedback method and apparatus for a virtual key, a device and a storage medium.

BACKGROUND

When using a mechanical keyboard, users can usually type blindly based on the distribution of the main keys on the keyboard, especially the distribution of the most commonly used 26 English letters, and the touch feel. This was once popular for fast input. However, as smart interfaces advance, virtual keyboards are widely used on electronic devices, especially mobile phone devices. The virtual keyboard lacks the real tactile feedback brought by the mechanical keyboard, which is difficult for users to type blindly, resulting in poor user experiences.

SUMMARY

A tactile feedback method and apparatus for a virtual key, a device and a storage medium are provided according to the embodiments of the present disclosure, which can at least solve the problem in related technologies of failure to type blindly because the virtual key lacks the real tactile feedback.

A tactile feedback method for a virtual key is provided according to a first aspect of the present disclosure. The tactile feedback method is applied to an electronic device. The electronic device includes an actuator. The tactile feedback method includes: detecting key operation status data in response to a key operation event; determining a key operation type according to the key operation status data, where the key operation type includes: key tapping operation, key surface touch operation, and key edge touch operation; selecting a tactile feedback strategy according to the key operation type and the key operation status data, where the tactile feedback strategy includes a tactile feedback mode and a tactile feedback attribute corresponding to the tactile feedback mode; and controlling the actuator to operate in a vibration working state according to the tactile feedback strategy.

A tactile feedback apparatus for a virtual key is provided according to a second aspect of the present disclosure. The tactile feedback apparatus includes: a detection module configured to detect key operation status data in response to a key operation event; a determination module configured to determine a key operation type according to the key operation status data, where the key operation type includes: key tapping operation, key surface touch operation, and key edge touch operation; a selection module configured to select a tactile feedback strategy according to the key operation type and the key operation status data, where the tactile feedback strategy includes a tactile feedback mode and a tactile feedback attribute corresponding to the tactile feedback mode; and a control module configured to control an actuator to operate in a vibration working state according to the tactile feedback strategy.

An electronic device is provided according to a third aspect of the present disclosure. The electronic device includes: an actuator, a memory and a processor. The processor is configured to execute a computer program stored in the memory to perform operations in the tactile feedback method as provided in the first aspect of the present disclosure.

A computer-readable storage medium on which a computer program is stored is provided according to a fourth aspect of the present disclosure. The computer program, when executed by a processor, causes the processor to implement operations in the tactile feedback method as provided in the first aspect of the present disclosure.

It can be seen that with the tactile feedback method and apparatus for a virtual key, the device and the storage medium provided in the embodiments of the present disclosure, key operation status data is detected in response to a key operation event. A key operation type is determined according to the key operation status data. The key operation type includes: key tapping operation, key surface touch operation, and key edge touch operation. A tactile feedback strategy is selected according to the key operation type and the key operation status data. The tactile feedback strategy includes a tactile feedback mode and a tactile feedback attribute corresponding to the tactile feedback mode. The actuator is controlled to operate in a vibration working state according to the tactile feedback strategy. With the implementation of the embodiments of the present disclosure, the tactile feedback strategy is selected according to the key operation event type by the user and key operation status data, for tactile feedback. In this way, the user can locate and identify the virtual key and therefore can blindly type, improving user experiences.

BRIEF DESCRIPTION OF THE DRAWINGS

In order to more clearly explain the embodiments of the present disclosure or the technical solutions in the conventional technology, the drawings for describing the embodiments or the conventional technology will be briefly introduced below. It is apparent that the drawings in the following description represent only some embodiments of present disclosure. For those skilled in the art, other drawings can also be obtained based on these drawings without creative efforts.

DETAILED DESCRIPTION OF THE EMBODIMENTS

In order to make the invention concept, features, and advantages of the present disclosure clear and understandable, the technical solutions in the embodiments of the present disclosure will be clearly and completely described below in conjunction with the drawings in the embodiments of the present disclosure. Obviously, the described embodiments are only some, not all, of the embodiments of the present disclosure. Based on the embodiments in the present disclosure, all other embodiments obtained by those skilled in the art without creative efforts shall fall within the scope of protection of the present disclosure.

In addition, the terms "first" and "second" are used for descriptive purposes only and should not be understood as indicating or implying relative importance or implicitly indicating the quantity of indicated technical features. Therefore, features defined as "first" and "second" may explicitly or implicitly include one or more of these features. In the description of the embodiments of the present disclosure, "plurality" means two or more, unless otherwise explicitly and specifically limited.

Figure 1:
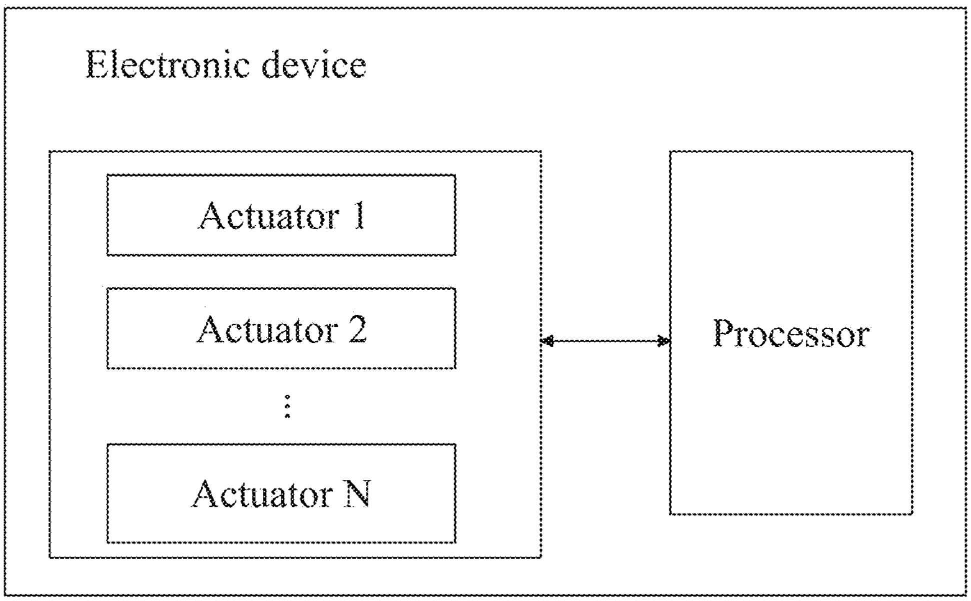
FIG. 1 is a schematic structural diagram illustrating an electronic device according to a first embodiment of the present disclosure.
Figure 2:
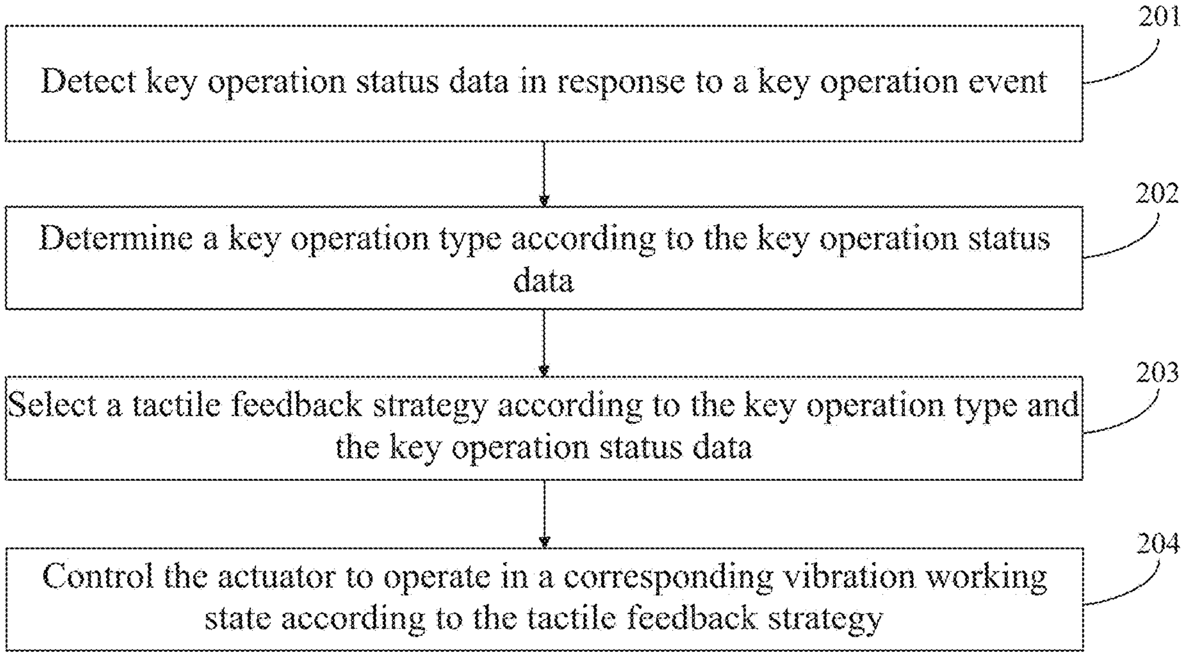
FIG. 2 is a flow chart illustrating a tactile feedback method for a virtual key in brief according to the first embodiment of the present disclosure.

To solve the problem in related technologies of failure to type blindly because the virtual key lacks the real tactile feedback, a tactile feedback method for a virtual key is provided according to a first embodiment of the present disclosure. The tactile feedback method is applied to an electronic device. FIG. 1 is a schematic structural diagram illustrating the electronic device according to the first embodiment. The electronic device includes an actuator. The number of actuators in this embodiment is at least one. The actuator may be an eccentric rotating mass (ERM) motor, a linear resonance actuator (LRA), or a piezoelectric actuator (Piezo). FIG. 2 is a flow chart illustrating the tactile feedback method for a virtual key in brief according to the first embodiment. The tactile feedback method includes the following operations 201 to 204.

In 201, key operation status data is detected in response to a key operation event.

Specifically, in this embodiment, after the virtual keyboard is called up in response to an operation instruction from the user, key operation events from the user are monitored in real time by sensors. When a key operation from the user is detected, key operation status data relevant to the key operation event is obtained, for analysis and processing based on the key operation status data. The virtual keyboard in this embodiment is provided with multiple sensors of different types. The key operation status data detected by various types of sensors. The key operation status data may be analog data or digital data.

In 202, a key operation type is determined according to the key operation status data.

Specifically, in this embodiment, after receiving the key operation status data relevant to the key operation event uploaded by the sensor, evaluation and analysis are performed based on these key operation status data to determine the key operation type. The key operation type may include tapping operation on the virtual key, sliding touch operation on the surface of the virtual key, and key edge touch operation when fingers leave the virtual keyboard or just touch the keyboard, according to the common usage form of blind typing by the user.

In some embodiments, determining the key operation type according to the key operation status data includes: matching key operation status data of multiple types with corresponding types of preset indicator threshold ranges to obtain multiple pieces of valid key operation status data, where the key operation status data includes: key operation pressure data, key operation position data, and key operation displacement data; and determining the key operation type according to target key operation status data among the multiple pieces of valid key operation status data.

Specifically, in this embodiment, the sensors may be pressure sensors, displacement sensors, acceleration sensors, sound wave sensors, position sensors, etc. The key operation status data is detected by these sensors. The status data corresponding to some key operation types is small, and therefore is ignored. For example, when the key operation type is the key tapping operation, the data detected by the displacement sensor is relatively small and therefore is ignored. In addition, there may be a malfunctioning sensor among the sensors. The data detected by the malfunctioning sensor may also be ignored accordingly. Therefore, in this embodiment the data uploaded by these sensors is filtered, thereby reducing the workload of data processing and improving the accuracy of data processing. Specifically, each type of key operation status data is matched with the corresponding type of indicator threshold range to obtain effective key operation status data. For example, the pressure data of key operation uploaded by the pressure sensor is matched with a preset pressure threshold range, and data exceeding this range is removed. Similarly, other types of key operation status data, such as speed data of the key operation, coordinate data corresponding to the key operation, and displacement data corresponding to the key operation, are also matched with the corresponding indicator threshold ranges to filter out valid data. Finally, the key operation type is determined based on the status data of the target type in the valid key operation status data.

Further, in some embodiments, determining the key operation type according to the target key operation status data among the multiple pieces of valid key operation status data includes: determining that the key operation type is the key tapping operation in a case that the key operation pressure data in the multiple pieces of valid key operation status data conforms to a preset pressure threshold range; determining that the key operation type is the key surface touch operation in a case that the key operation event is a valid key operation event and the key operation displacement data in the multiple pieces of valid key operation status data conforms to a preset displacement threshold range; and determining that the key operation type is the key edge touch operation in a case that the key operation coordinate data in the multiple pieces of valid key operation status data conforms to a preset first target coordinate range, where the first target coordinate range corresponds to coordinates at an edge position of the virtual key.

Specifically, in this embodiment, the indicator threshold range are set for each type of status data based on historical experience values. The indicator threshold range of each type is smaller than the aforementioned indicator threshold range for filtering the valid data for determining the key operation type. Specifically, when the pressure data in the valid key operation status data meets the preset pressure threshold range, the key operation type is determined to be the key tapping operation. The pressure data for the key operation is the pressure detected by the pressure sensor when the user performs the key operation. When the displacement data in the valid key operation status data meets the preset displacement threshold range, the key operation type is determined to be the key surface touch operation. The key operation displacement data is a swipe displacement detected by the displacement sensor when the user performs the key operation. When the coordinate data in the valid key operation status data matches the target coordinate range, the key operation type is determined to be the key edge touch operation. The target coordinate range is the position coordinate range of the edge of each virtual key. The key operation coordinate data is the coordinate of the key operation detected by the position sensor. It should be noted that in the above-mentioned determination of the corresponding key operation type based on the data of target type, the target type is not limited to the above-mentioned pressure data, coordinate data, and displacement data, but depends on the actual applications. For example, the key operation type may be determined to be the key surface touch operation based on the speed data or pressure data relevant to the key operation.

Furthermore, in some embodiments, before determining that the key operation type is the key surface touch operation, the tactile feedback method further includes: matching the key operation coordinate data in the valid key operation status data with a preset second target coordinate range, where the second target coordinate range corresponds to coordinates in a letter key area in a virtual keyboard; and determining that the key operation event is the valid key operation event in a case that the key operation coordinate data conforms to the second target coordinate range.

Specifically, in this embodiment, in order to provide the user with more accurate tactile feedback, tactile feedback for touch operations on the key surface is provided only in the letter distribution area on the virtual keyboard. Therefore, the coordinate data in the valid key operation status data is matched with the target coordinate range to determine whether the key operation event is a valid key operation event, that is, whether the key operation area is a valid area. The target coordinate range is the coordinate range of the letter area in the virtual keyboard. In addition, tactile feedback for surface touch operations may also be provided for the digital area on the virtual keyboard as needed. That is, the digital area serves as a valid area.

In 203, a tactile feedback strategy is selected according to the key operation type and the key operation status data.

Specifically, in this embodiment, after the operation type of the key operation event is determined, the corresponding tactile feedback strategy is selected according to the key operation type and the key operation status data. In this embodiment, the tactile feedback strategy includes a tactile feedback mode and a tactile feedback attribute corresponding to the tactile feedback mode, so as to accurately present different tactile feedbacks.

In some embodiments, selecting the tactile feedback strategy according to the key operation type and the key operation status data includes: determining the tactile feedback mode according to the key operation type, where the tactile feedback mode includes vibration feedback and texture feedback; and determining the tactile feedback attribute corresponding to the tactile feedback mode according to the tactile feedback mode and the key operation status data.

Specifically, in this embodiment, the tactile feedback mode is first selected according to the key operation type, and then attributes of the tactile feedback are determined according to the tactile feedback mode and the key operation status data. The tactile feedback mode in this embodiment may be vibration feedback, texture feedback, force feedback, or other feasible feedback mode such as temperature feedback.

Further, in some embodiments, determining the tactile feedback mode according to the key operation type includes: determining that the tactile feedback mode is the vibration feedback in a case that the key operation type is the key tapping operation or the key edge touch operation; and determining that the tactile feedback mode is the texture feedback in a case that the key operation type is the key surface touch operation.

Specifically, in this embodiment, the tactile feedback mode of vibration feedback is provided for the key tapping operation and the key edge touch operation, and the tactile feedback mode of texture feedback is provided for the key surface touch operation. In addition, the tactile feedback mode may be determined according to the keys, and different tactile feedback modes are provided for different keys. For example, a combination feedback mode is provided for digital keys and a single feedback mode is provided for letter keys. The feedback mode corresponding to each key operation type may be the single feedback mode or combined feedback mode.

Further, in some embodiments, determining the tactile feedback attribute corresponding to the tactile feedback mode according to the tactile feedback mode and the key operation status data includes: determining vibration intensity and vibration duration based on the key operation pressure data and key operation duration in the key operation status data in a case that the tactile feedback mode is the vibration feedback; determining a target key object according to key coordinate data in the key operation status data in a case that the tactile feedback mode is the texture feedback; and querying a texture form from a preset texture form index table according to the target key object.

Figure 3:
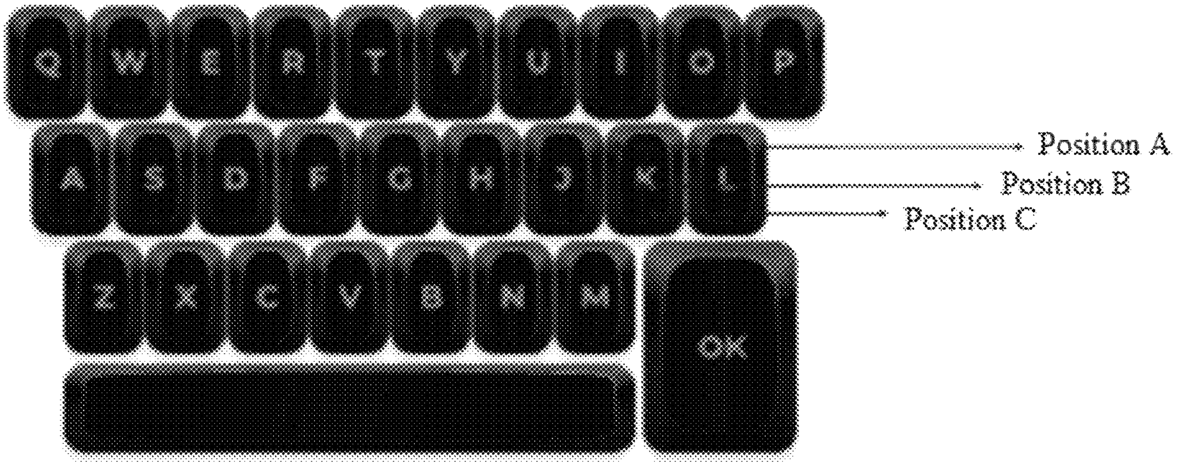
FIG. 3 is a schematic diagram illustrating division of key operation positions according to the first embodiment of the present disclosure.

Specifically, in this embodiment, when selecting the tactile feedback mode of vibration feedback, it is necessary to further determine the properties of the vibration, such as vibration intensity, vibration duration, etc. Specifically, the vibration intensity and vibration duration are determined based on the pressure data in the key operation status data and the duration of the key operation, so as to provide tactile feedback following the duration and pressure of the user pressing a key. For example, when the user taps a key, the key is given short and crisp feedback, which enhances the confirmation feeling of the virtual key and gives the user a real key feeling. The vibration is triggered when the user touches the edge of the key, for example, a position A and position C in the schematic diagram of key operation positions shown in FIG. 3, that is, when the user leaves the key from the edge or touches the edge of the key, to provide the user with a clear sense of key boundaries. When the user swipes at a position B, that is, when the tactile feedback mode of texture feedback is selected, the target key object is determined based on the coordinate data in the key operation status data. In this embodiment, different or the same texture forms are provided for different letter keys. For example, a raised texture is provided for the letter "F" and the letter "J" keys, and a smooth texture is provided for the other letters such as the "K" key. Further, a corresponding simulated texture, such as leather texture, is provided according to the graphic type of the virtual keyboard. The texture form index table in this embodiment includes a mapping relationship between different key objects and their corresponding texture forms. Different texture forms have different vibration frequencies. The tactile feedback with subtle texture allows users to accurately identify different letter key areas.

In 204, the actuator is controlled to operate in a corresponding vibration working state according to the tactile feedback strategy.

Specifically, in this embodiment, after the tactile feedback strategy, that is, the tactile feedback mode and the tactile feedback attribute, is determined, a corresponding drive signal is generated and transmitted to the actuator to control the actuator to operate in the corresponding vibration working state.

Based on the technical solutions in the above embodiments of the present disclosure, the key operation status data is detected in response to the key operation event. The key operation type is determined according to the key operation status data. The key operation type includes: key tapping operation, key surface touch operation, and key edge touch operation. The tactile feedback strategy is selected according to the key operation type and the key operation status data. The tactile feedback strategy includes the tactile feedback mode and the tactile feedback attribute corresponding to the tactile feedback mode. The actuator is controlled to operate in the vibration working state according to the tactile feedback strategy. With the implementation of the solutions of the present disclosure, the tactile feedback strategy is selected according to the key operation event type by the user and key operation status data, for tactile feedback. In this way, the user can locate and identify the virtual key and therefore can blindly type, thereby improving user experiences.

Figure 4:
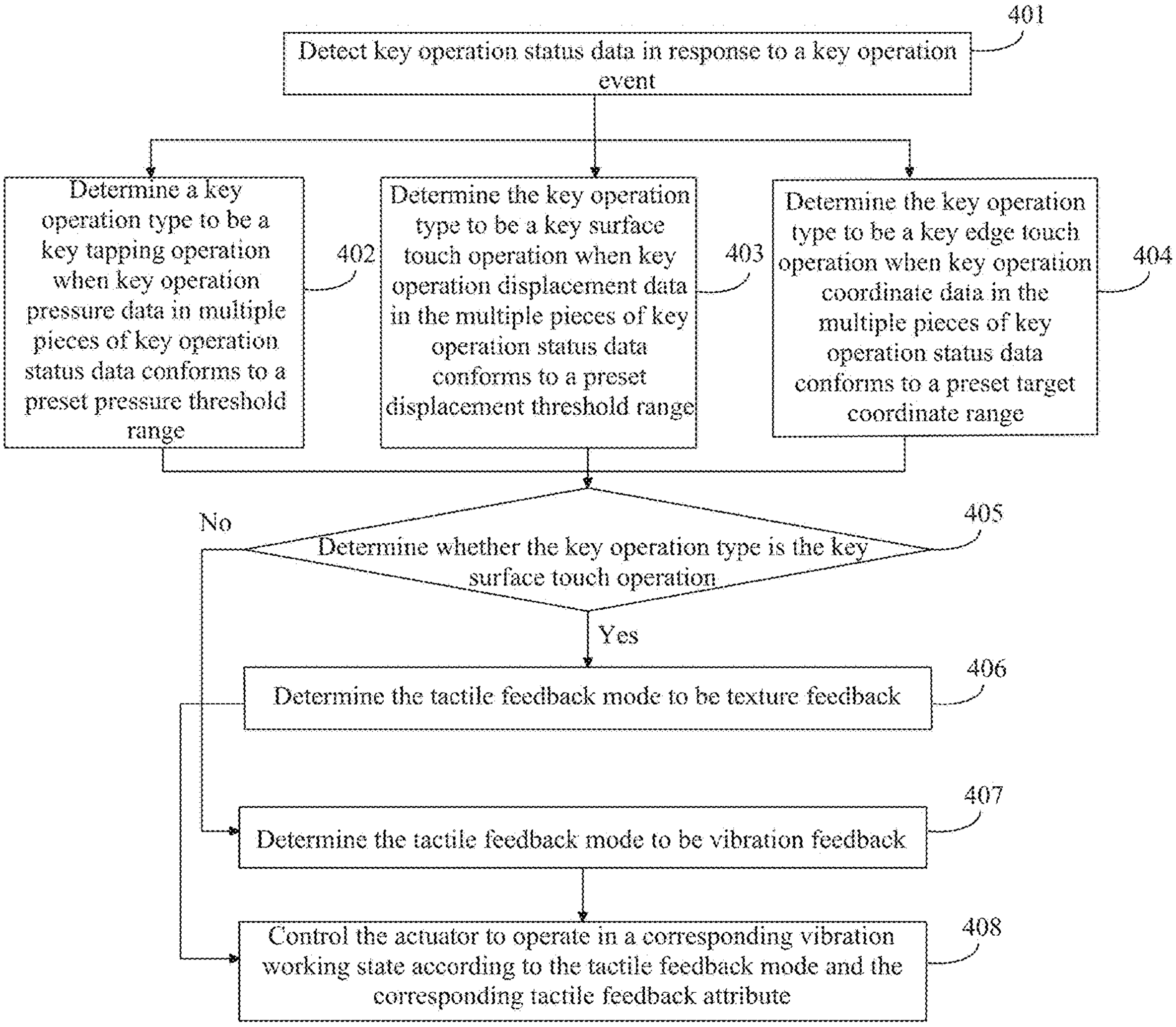
FIG. 4 is a flow chart illustrating a tactile feedback method for a virtual key in detail according to a second embodiment of the present disclosure.

FIG. 4 is a flow chart illustrating the tactile feedback method for a virtual key in detail according to a second embodiment of the present disclosure. The tactile feedback method includes the following operations 401 to 408.

In 401, key operation status data is detected in response to a key operation event.

In 402, a key operation type is determined to be a key tapping operation when key operation pressure data in multiple pieces of key operation status data conforms to a preset pressure threshold range.

In 403, the key operation type is determined to be a key surface touch operation when key operation displacement data in the multiple pieces of key operation status data conforms to a preset displacement threshold range.

In 404, the key operation type is determined to be a key edge touch operation when key operation coordinate data in the multiple pieces of key operation status data conforms to a preset target coordinate range.

In 405, it is determined whether the key operation type is the key surface touch operation. If it is determined that the key operation type is the key surface touch operation, operation 406 is performed. If it is determined that the key operation type is not the key surface touch operation, operation 407 is performed.

In 406, the tactile feedback mode is determined to be texture feedback.

In 407, the tactile feedback mode is determined to be vibration feedback.

In 408, the actuator is controlled to operate in a corresponding vibration working state according to the tactile feedback mode and the corresponding tactile feedback attribute.

Figure 5:
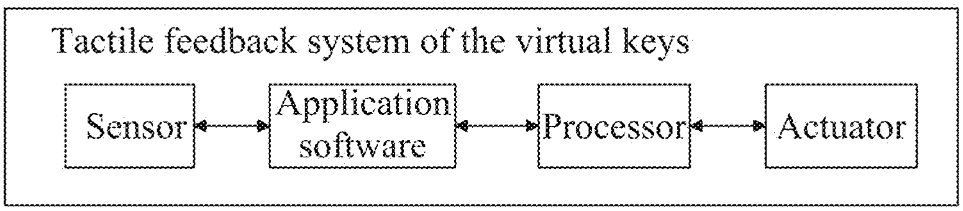
FIG. 5 is a schematic structural diagram illustrating a tactile feedback system for a virtual key according to a second embodiment of the present disclosure.

Specifically, in this embodiment, tactile feedback is provided for the following key operation types according to the usage form of blind typing by the user: virtual key tapping operation, virtual key surface touch operation, and virtual key edge touch operation. The tactile feedback includes vibration feedback, force feedback, texture feedback, temperature feedback, etc. In order to effectively realize blind typing on the virtual keyboard, cooperation of software and hardware is necessary. The specific structure is as shown in FIG. 5, which is a schematic structural diagram illustrating a tactile feedback system of the virtual keys. The sensor monitors the triggering event or behavior. The application software controls the triggering event and issues control instructions. The processor processes the corresponding instructions, sends data to drive the actuator to respond, so as to implement different tactile feedback for different virtual key operations, thereby realizing blind typing.

It should be understood that the sequence numbers of operations in this embodiment do not mean the order in which the operation s are performed. The order in which the operations are performed should depend on their functions and internal logic, and should not constitute the only limitation on the implementation process of the embodiments of the present disclosure.

Figure 6:
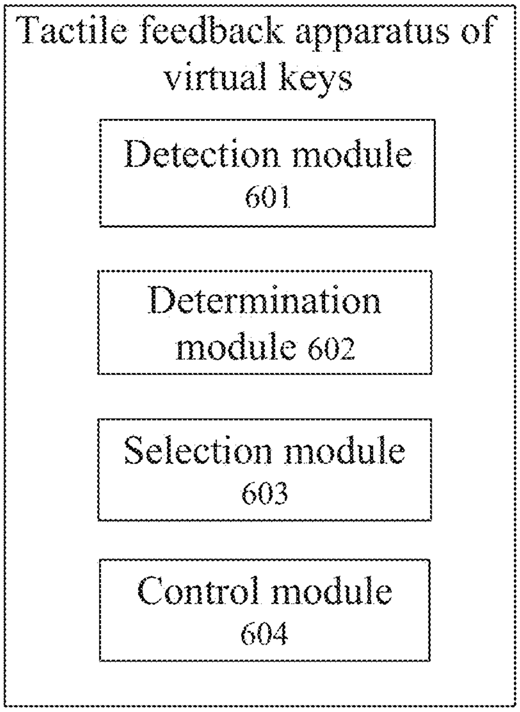
FIG. 6 is a schematic module diagram illustrating a tactile feedback apparatus for a virtual key according to a third embodiment of the present disclosure.

FIG. 6 is a schematic module diagram illustrating a tactile feedback apparatus for a virtual key according to a third embodiment of the present disclosure. The tactile feedback apparatus is applicable to the tactile feedback method as describe above. As shown in FIG. 6, the tactile feedback apparatus includes a detection module 601, a determination module 602, a selection module 603 and a control module 604.

The detection module 601 is configured to detect key operation status data in response to a key operation event.

The determination module 602 is configured to determine a key operation type according to the key operation status data. The key operation type includes: key tapping operation, key surface touch operation, and key edge touch operation.

The selection module 603 is configured to select a tactile feedback strategy according to the key operation type and the key operation status data. The tactile feedback strategy includes a tactile feedback mode and a tactile feedback attribute corresponding to the tactile feedback mode.

The control module 604 is configured to control an actuator to operate in a vibration working state according to the tactile feedback strategy.

In some embodiments, the determination module is specifically configured to: match key operation status data of multiple types with corresponding types of preset indicator threshold ranges to obtain multiple pieces of valid key operation status data, where the key operation status data includes: key operation pressure data, key operation position data, and key operation displacement data; and determine the key operation type according to target key operation status data among the multiple pieces of valid key operation status data.

Further, in some embodiments, the determination module is further configured to: determine that the key operation type is the key tapping operation in a case that the key operation pressure data in the multiple pieces of valid key operation status data conforms to a preset pressure threshold range; determine that the key operation type is the key surface touch operation in a case that the key operation event is a valid key operation event and the key operation displacement data in the multiple pieces of valid key operation status data conforms to a preset displacement threshold range; and determine that the key operation type is the key edge touch operation in a case that the key operation coordinate data in the multiple pieces of valid key operation status data conforms to a preset first target coordinate range.

The first target coordinate range corresponds to coordinates at an edge position of the virtual key.

Furthermore, in some embodiments, the determination module is further configured to: before determining that the key operation type is the key surface touch operation, match the key operation coordinate data in the valid key operation status data with a preset second target coordinate range, where the second target coordinate range corresponds to coordinates in a letter key area in a virtual keyboard; and determine that the key operation event is the valid key operation event in a case that the key operation coordinate data conforms to the second target coordinate range.

In some embodiments, the selection module is specifically configured to: determine the tactile feedback mode according to the key operation type, where the tactile feedback mode includes vibration feedback and texture feedback; and determine the tactile feedback attribute corresponding to the tactile feedback mode according to the tactile feedback mode and the key operation status data.

Further, in some embodiments, the selection module is further configured to: determine that the tactile feedback mode is the vibration feedback in a case that the key operation type is the key tapping operation or the key edge touch operation; and determine that the tactile feedback mode is the texture feedback in a case that the key operation type is the key surface touch operation.

Further, in some embodiments, the selection module is further configured to: determine vibration intensity and vibration duration based on the key operation pressure data and key operation duration in the key operation status data in a case that the tactile feedback mode is the vibration feedback; determine a target key object according to key coordinate data in the key operation status data in a case that the tactile feedback mode is the texture feedback; and querying a texture form from a preset texture form index table according to the target key object.

It should be noted that the tactile feedback method in the foregoing embodiments can be implemented based on the tactile feedback apparatus provided in this embodiment. Those skilled in the art should clearly understand that for the convenience and simplicity of description, the specific operation process of the tactile feedback apparatus described in this embodiment can be referred to the corresponding process in the foregoing method embodiments, and therefore is not detailed herein.

Based on the technical solutions in the above embodiments of the present disclosure, the key operation status data is detected in response to the key operation event. The key operation type is determined according to the key operation status data. The key operation type includes: key tapping operation, key surface touch operation, and key edge touch operation. The tactile feedback strategy is selected according to the key operation type and the key operation status data. The tactile feedback strategy includes the tactile feedback mode and the tactile feedback attribute corresponding to the tactile feedback mode. The actuator is controlled to operate in the vibration working state according to the tactile feedback strategy. With the implementation of the solutions of the present disclosure, the tactile feedback strategy is selected according to the key operation event type by the user and key operation status data, for tactile feedback. In this way, the user can locate and identify the virtual key and therefore can blindly type, thereby improving user experiences.

Figure 7:
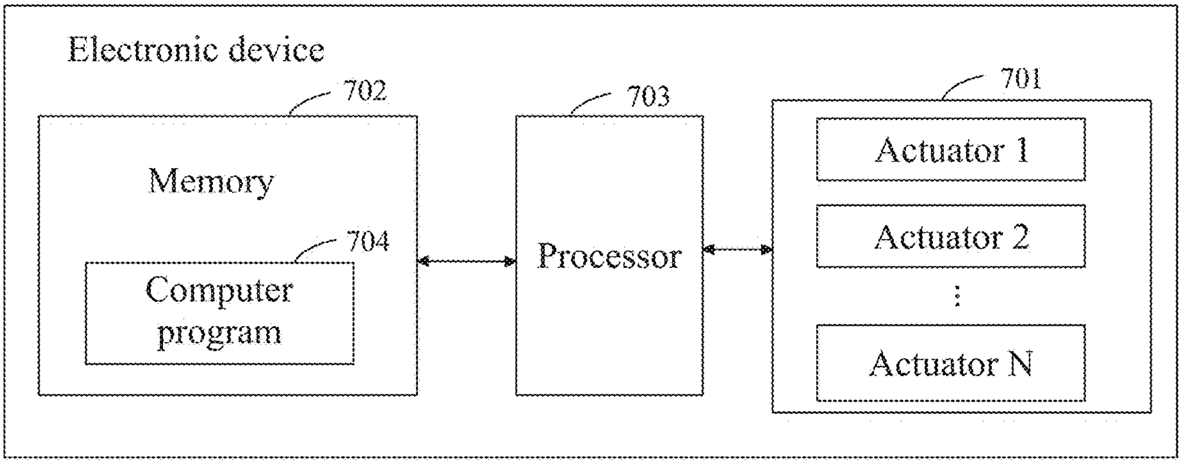
FIG. 7 is a schematic structural diagram illustrating an electronic device according to a fourth embodiment of the present disclosure.

FIG. 7 is a schematic structural diagram illustrating an electronic device according to a fourth embodiment of the present disclosure. The electronic device is configured to implement the tactile feedback method in the foregoing embodiments.

The electronic device includes: an actuator 701, a memory 702, a processor 703, and a computer program 704 stored in the memory 702 and executable by the processor 703. The memory 702 and the processor 703 are connected through communication. When the processor 703 executes the computer program 704, the method in the first or second embodiment is implemented. The number of processors may be one or more.

The memory 702 may be a high-speed random access memory (RAM) or a non-volatile memory, for example, a disk memory. The memory 702 is configured to store executable program codes. The processor 703 is coupled to the memory 702.

Furthermore, a computer-readable storage medium is also provided according to the embodiments of the present disclosure. The computer-readable storage medium may be provided in the above-mentioned electronic device. The computer-readable storage medium may be the memory in the embodiment as shown in FIG. 7.

A computer program is stored on the computer-readable storage medium. When this program is executed by the processor, the tactile feedback method in the aforementioned embodiments is implemented. Furthermore, the computer-storable medium may also be a USB flash drive, a mobile hard disk, a read-only memory (ROM), a RAM, a magnetic disk or an optical disk, and other media that can store program codes.

In the several embodiments of the present disclosure, it should be understood that the disclosed apparatus and method may be implemented in other ways. The apparatus embodiments described above are merely illustrative. For example, the division of modules is only a logical function division, and there may be other divisions in actual implementation. For example, multiple modules or components may be combined or integrated into another system, or some features can be omitted, or not implemented. On the other hand, the coupling or direct coupling or communication connection between each other shown or discussed may be through some interfaces. The indirect coupling or communication connection between devices or modules may be in electrical, mechanical or other forms.

Modules described as separate components may or may not be physically separated, and components shown as modules may or may not be physical modules, that is, may be located in one place, or distributed among multiple network modules. Some or all of the modules may be selected according to actual needs to achieve the purpose of the solution of the embodiments.

In addition, each functional module in each embodiment of the present disclosure may be integrated into one processing module, or each module may exist physically alone, or two or more modules may be integrated into one module. The above integrated modules may be implemented in the form of hardware or software function modules.

Integrated modules may be stored in the computer-readable storage medium if implemented in the form of software function modules and sold or used as independent products. Based on this understanding, the technical solutions of the present disclosure are essentially or contributes to the existing technology, or all or part of the technical solutions can be implemented in the form of a software product. The computer software product is stored in a readable storage medium and includes a number of instructions to cause a computer device (for example, a personal computer, a server, or a network device) to execute all or part of the operations of the method in the various embodiments of the present disclosure. The aforementioned readable storage medium may include: a U disk, a mobile hard disk, a ROM, a RAM, a magnetic disk, an optical disk or other medium that can store program codes.

It should be noted that for the convenience of description, the foregoing method embodiments are expressed as a series of action combinations. However, those skilled in the art should know that the present disclosure is not limited by the sequence of actions described. This is because that according to the present disclosure, certain operations may be performed in a different order or simultaneously. Secondly, those skilled in the art should also know that the embodiments described in the specification are all preferred embodiments, and the actions and modules involved are not necessarily necessary for the present disclosure.

In the above embodiments, each embodiment is described with its own emphasis. For parts that are not described in detail in a certain embodiment, reference can be made to the relevant descriptions of other embodiments.

The above is a description of the tactile feedback method and apparatus for a virtual key, device and storage medium according to the present disclosure. Those skilled in the art can make changes in the specific implementation methods and application scope based on the ideas of the embodiments of the present disclosure. In summary, the contents of this specification should not be construed as limiting the present disclosure.

What is claimed is:

1. A tactile feedback method for a virtual key, applied to an electronic device, the electronic device comprises an actuator, and the tactile feedback method comprises:

detecting key operation status data in response to a key operation event;

determining a key operation type according to the key operation status data, wherein the key operation type comprises: key tapping operation, key surface touch operation, and key edge touch operation;

selecting a tactile feedback strategy according to the key operation type and the key operation status data, wherein the tactile feedback strategy comprises a tactile feedback mode and a tactile feedback attribute corresponding to the tactile feedback mode; and controlling the actuator to operate in a vibration working state according to the tactile feedback strategy;

wherein selecting the tactile feedback strategy according to the key operation type and the key operation status data comprises:

determining the tactile feedback mode according to the key operation type, wherein the tactile feedback mode comprises vibration feedback and texture feedback; and determining the tactile feedback attribute corresponding to the tactile feedback mode according to the tactile feedback mode and the key operation status data;

wherein determining the tactile feedback mode according to the key operation type comprises:

determining that the tactile feedback mode is the vibration feedback in a case that the key operation type is the key tapping operation or the key edge touch operation; and determining that the tactile feedback mode is the texture feedback in a case that the key operation type is the key surface touch operation.

2. The tactile feedback method according to claim 1, wherein determining the key operation type according to the key operation status data comprises:

matching a plurality types of key operation status data with corresponding types of preset indicator threshold ranges to obtain a plurality pieces of valid key operation status data, wherein the key operation status data comprises: key operation pressure data, key operation position data, and key operation displacement data; and determining the key operation type according to target key operation status data among the plurality pieces of valid key operation status data.

3. The tactile feedback method according to claim 2, wherein determining the key operation type according to the target key operation status data among the plurality pieces of valid key operation status data comprises:

determining that the key operation type is the key tapping operation in a case that the key operation pressure data in the plurality pieces of valid key operation status data conforms to a preset pressure threshold range;

determining that the key operation type is the key surface touch operation in a case that the key operation event is a valid key operation event and the key operation displacement data in the plurality pieces of valid key operation status data conforms to a preset displacement threshold range; and determining that the key operation type is the key edge touch operation in a case that the key operation position data in the plurality pieces of valid key operation status data conforms to a preset first target coordinate range, wherein the first target coordinate range corresponds to coordinates at an edge position of the virtual key.

4. The tactile feedback method according to claim 3, wherein before the determining that the key operation type is the key surface touch operation, the tactile feedback method further comprises:

matching the key operation position data in the valid key operation status data with a preset second target coordinate range, wherein the second target coordinate range corresponds to coordinates in a letter key area in a virtual keyboard; and determining that the key operation event is the valid key operation event in a case that the key operation position data conforms to the second target coordinate range.

5. The tactile feedback method according to claim 1, wherein determining the tactile feedback attribute corresponding to the tactile feedback mode according to the tactile feedback mode and the key operation status data comprises:

determining vibration intensity and vibration duration based on the key operation pressure data and key operation duration in the key operation status data in a case that the tactile feedback mode is the vibration feedback;

determining a target key object according to key coordinate data in the key operation status data in a case that the tactile feedback mode is the texture feedback; and querying a texture form from a preset texture form index table according to the target key object.

* * * * *